Patented Apr. 21, 1942

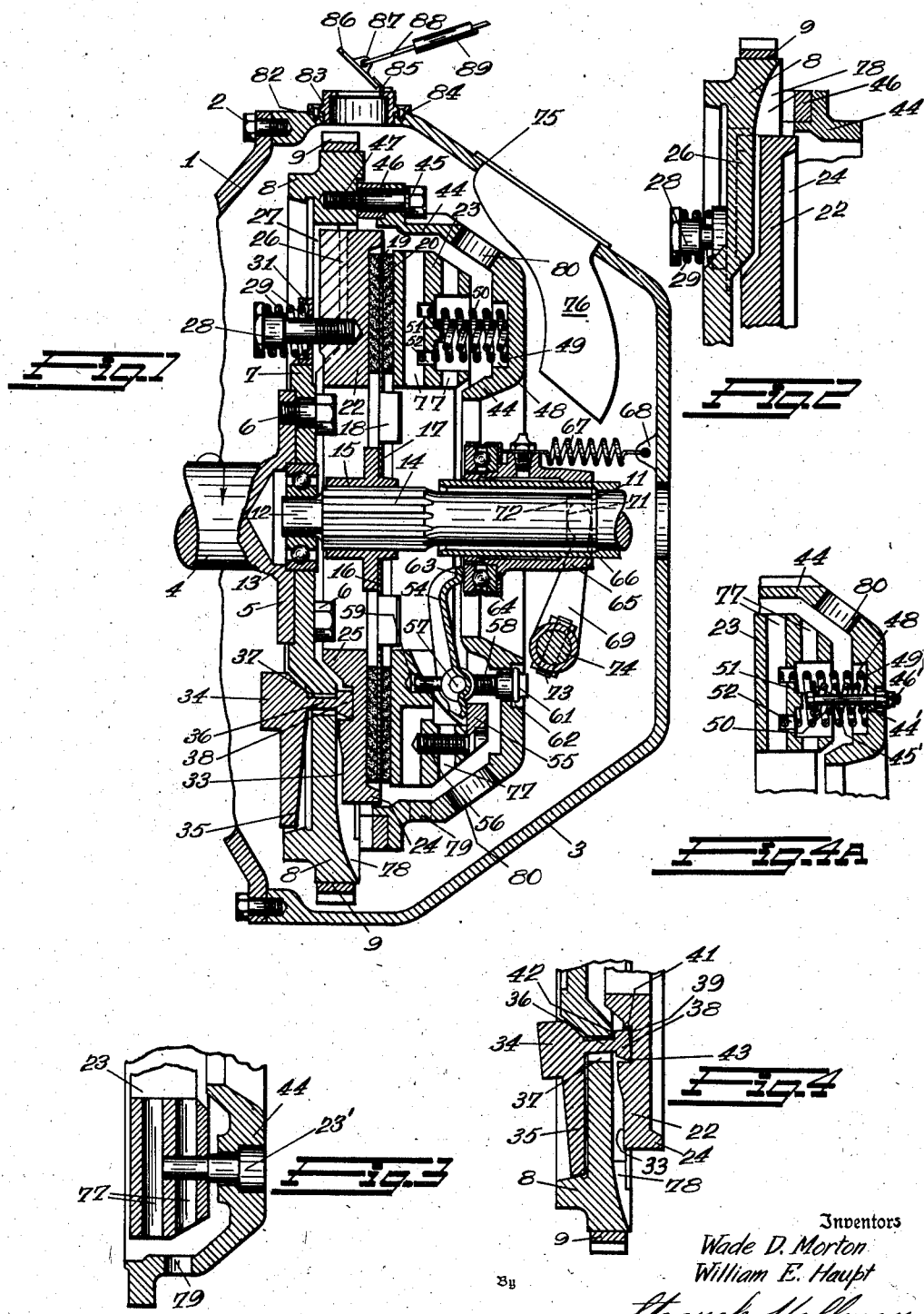

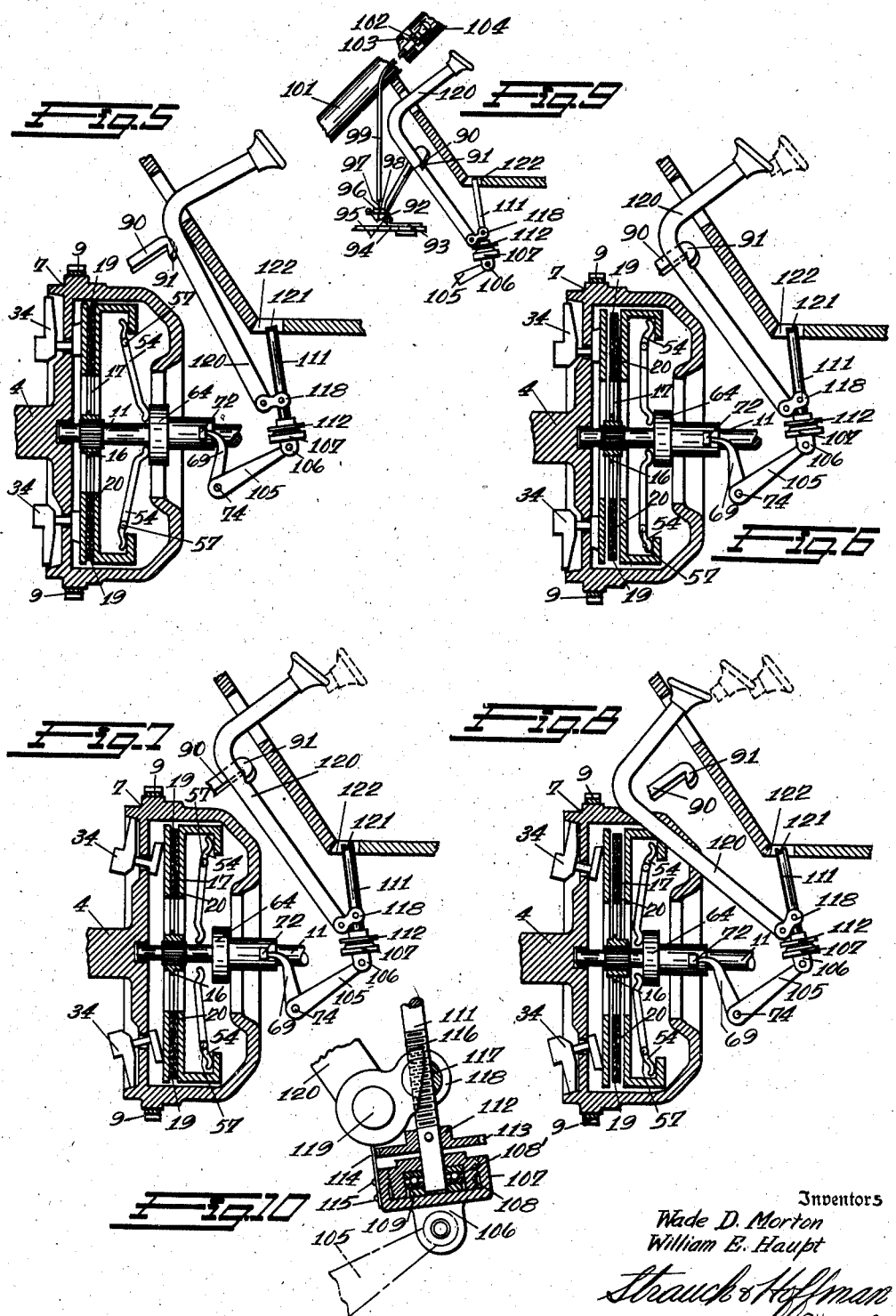

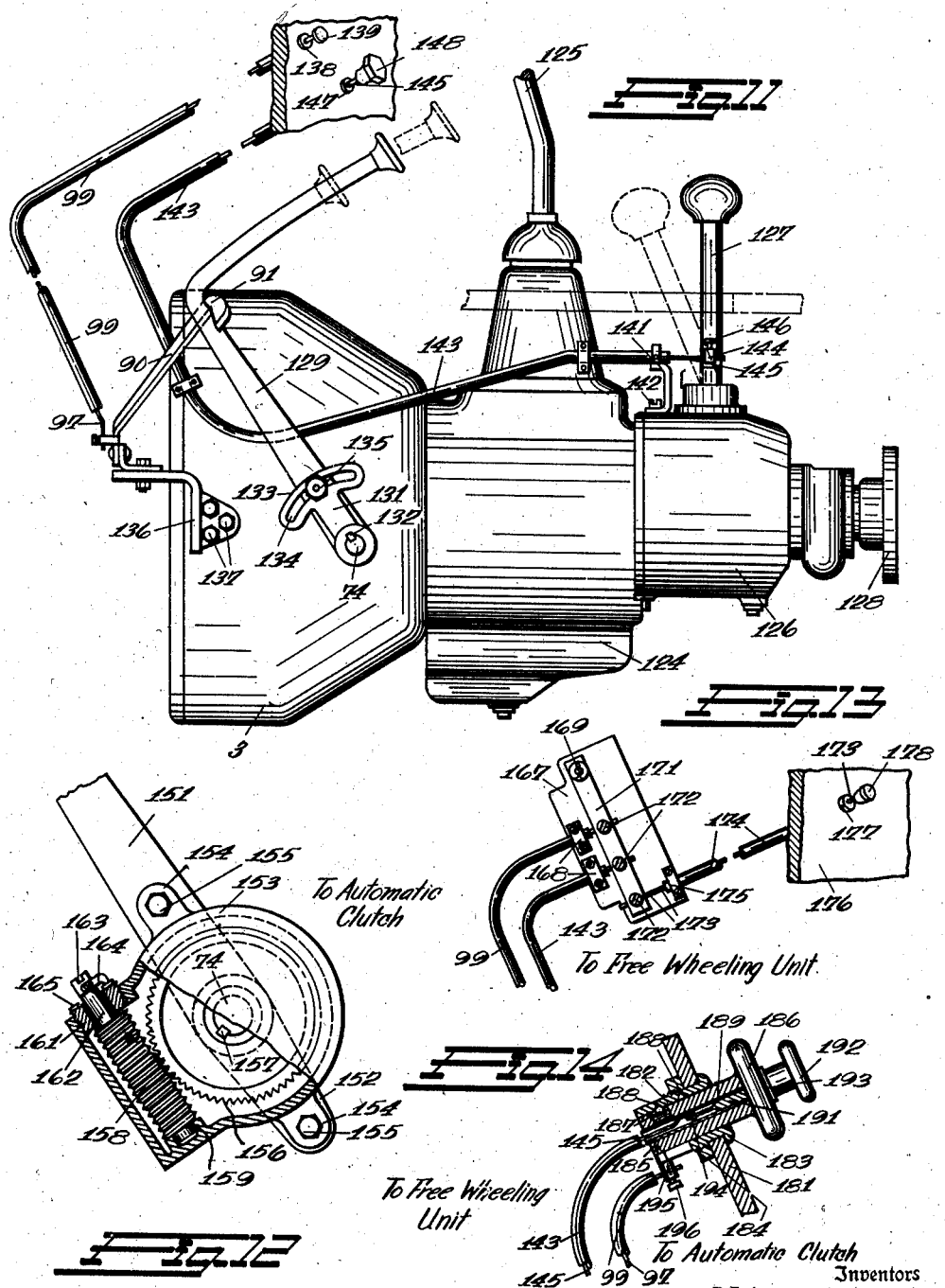

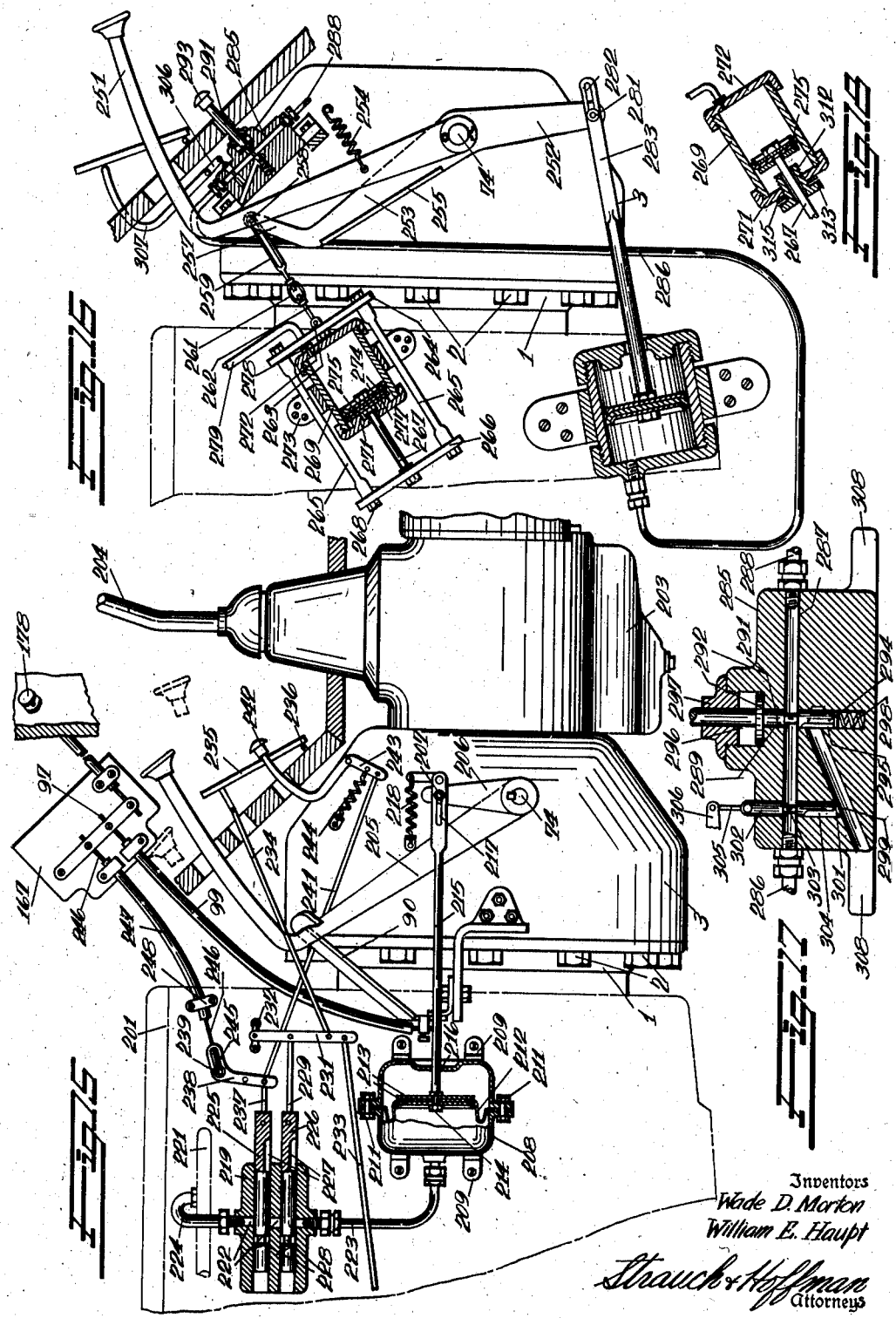

2,280,127

UNITED STATES PATENT OFFICE 2,280,127

POWER TRANSMITTING MECHANISM FOR RAIL CARS, MOTOR VEHICLES, AND THE LIKE

Wade D. Morton, Gloucester City, and William E. Haupt, Westville, N. J., assignors to Automatic Drive & Transmission Company, Gloucester City, N. J., a corporation of New Jersey Application February 25, 1932, Serial No. 595,184

24 Claims. (Cl. 192—105)

The present invention relates to novel power transmitting mechanisms, and more particularly to power transmitting mechanisms especially adapted for rail cars, motor vehicles and the like in which manually operable torque multiplying transmission mechanisms are interposed between the prime mover and driven wheels of the vehicle.

Because of the difficulties of handling heavy powers in vehicles embodying the usual manually controlled clutch and torque multiplying gear transmissions, mechanical transmission of power from the prime mover to the driven wheels of vehicles has heretofore been limited to pleasure cars, commercial road vehicles, and light self-propelled rail cars. With the increase in power to be transmitted in motor vehicles, increased difficulty of manual clutch and gear shift operation has developed. In the automotive field an insistent demand has arisen for greater ease of operation, while in the self-propelled rail transportation field, heavy complicated, and costly gas electric transmissions have been developed because of the impracticability of direct mechanical transmission of power from the prime mover to the driven wheels.

In modern motor vehicle operation two types of so-called free-wheeling have become popular as a result of efforts to simplify motor vehicle operation and to minimize the manual effort necessary to control the vehicle clutches in common use. In the first type, known as automatic free-wheeling, disconnection of the engine or motor from the rear wheels is effected automatically either by a vacuum clutch operator in response to closing of the engine throttle, or by means of an over-running clutch, operative to disconnect the engine when the wheel driving propeller shaft tends to run ahead of the engine shaft. In such arrangements shifting of the transmission without manual clutch operation is permitted while the engine is disconnected which occurs when the engine throttle is closed. The second type is so-called controlled free-wheeling in which a control operation is required by the driver when it is desired to disconnect the engine from the driven wheels to shift the transmission or to permit the vehicle to coast in so-called free-wheeling condition. Both types of free-wheeling have vigorous proponents, the controlled free-wheeling being asserted to be more desirable for traffic driving while the automatic free-wheeling is considered more desirable for open-country driving.

In the drives of the automatic free-wheeling type, means are provided to prevent automatic free-wheeling operation when it is desired to use the engine for deceleration or braking purposes, or when it is desired to start the engine when cold, or when the starting battery is low, by towing the vehicle or by permitting it to roll down a grade for the purpose of turning the engine over.

None of the so-called free-wheeling drive arrangements heretofore proposed have, however, been entirely satisfactory from a practical viewpoint. Vacuum operators both in the so-called controlled and automatic free-wheeling types of mechanism increase the load on the clutch and require expensive clutch and throwout bearing constructions in order that satisfactory life may be secured. Furthermore, such existing mechanisms must be set to cause slow engagement of the clutch with the result that racing of the engine and abuse of the clutch facings is permitted by the development of excessive engine speeds when the throttle of the engine is opened suddenly with the clutch in automatic disengaged position. The delay in engagement also introduces sufficient lag in clutch operation so that if the vehicle is brought to rest on an upward grade with automatic clutch operation, care and skill must be exercised in starting to prevent backward drift of the vehicle when the vehicle is released and the throttle is opened, before the comparatively slow and lagging clutch engagement can occur.

The overrunning clutch type of free-wheeling drive is subject to the disadvantage, that when the vehicle is at rest, the clutch must be manually operated for shift purposes, and free shift without manual clutch operation can be secured only while the vehicle is moving at a sufficiently high speed so that the propeller shaft runs ahead of the engine shaft to effect automatic disconnection of the engine by the overrunning clutch operation.

In the preferred embodiments of our invention an automatic two-directional-drive clutch is provided ahead of a manually controlled transmission and an automatic one-directional-drive clutch is located behind the transmission. The clutch ahead of the manually controlled transmission disengages the connection between the engine and the transmission while the engine is at or below idling speeds, and the clutch back of the manually controlled transmission releases automatically when the wheel driving propeller shaft tends to run ahead of the engine driven transmission shaft, thereby bringing the transmission to rest during shift operations, whereby very heavy powers may be handled with comparatively easy manual shift operation and manual clutch operation is eliminated, thereby providing a conveniently operable and highly practical mechanical drive for rail cars of sizes which have been heretofore impractical with mechanical drives, as well as for motor vehicles of all types.

In the preferred embodiments of our invention novel centrifugally operated clutch mechanisms are utilized in which spring pressure is built up in stages on clutch linings containing a large percentage of solid lubricant preferably of the type disclosed in Heinrich Patent No. 1,979,880, granted November 6, 1934. Our improved clutch operates gradually to pick up the load by a slipping drive while assuring a positive driving coupling of the clutch members when a desired predetermined speed is reached. By utilization of our improved clutch mechanism, the number of shift operations, and the number of gear reductions in the transmission required for motor vehicle operation are reduced to a minimum, permitting the use of transmissions of minimum size and weight for the delivery of a given power. Our improved clutch mechanism, in which the spring pressures are built up in stages, is adapted to the use of a simple lock-out construction for the automatic mechanism to permit convenient manual or automatic conversion to a constantly engaged manual clutch, which may be controlled in the conventional manner, and in automatic operation reduces the pressures on the clutch parts in the disengaged clutch position. In motor vehicles embodying our improved clutch approximately ninety to ninety-five percent of the normal shift operations may be eliminated as the vehicle may be started in high gear under normal driving conditions, shift operations being necessary only when an unusually quick pick-up of the load is desired for rapid starting, or when the maximum torque delivery of the prime mover is not sufficient in high gear to overcome the resistance to movement of the vehicle as when starting on a grade.

To further aid in the operation of motor vehicles particularly of heavy types, we have provided novel combinations of pneumatic, oil pressure, or other power operated controls for the disengagement of the clutch mechanisms during shift operation in which the necessity for very slow engaging or restoring motion after a declutching operation, essential in existing power clutch operators with its attendant disadvantages and dangers, is eliminated.

Accordingly, a primary object of the present invention is the provision of a simplified drive for motor vehicles including improved clutch mechanisms and/or transmission mechanisms provided with simple manual controls permitting automatic or manually controlled disconnection of the engine from the driving wheels of the vehicle at the will of the operator for the purpose of securing free-wheeling operation, or for permitting easy gear shifting and simplified motor vehicle operation, and whereby the transmission of larger powers from a prime mover through a mechanical drive, than has heretofore been possible, is made commercially feasible.

Another object of our invention is the provision of a vehicle drive embodying automatic clutch and manual control mechanism whereby the operator of the vehicle may, by simple operations, secure the advantages of controlled or automatic free-wheeling and automatic clutch operation at will, or may conveniently lock out automatic operation and provide the usual manually controlled type of connection between the engine and rear wheels to start the engine when cold or when the starting battery is low, by towing or rolling the vehicle down a grade to turn the engine over.

A further object of the present invention is to provide simplified drive and control mechanisms for motor vehicles in which manual clutch operation may be substantially or entirely eliminated or utilized at the will of the operator, and extreme ease of shift operation is provided.

Another object of our invention is to provide novel means for holding the clutch pedal in the correct position for automatic operation, which may, at the will of the operator, be conveniently manipulated to release the clutch pedal for manual operation thereof.

A further object of the present invention is to provide novel means for automatically causing the clutch mechanism to take the correct position that it should assume for effecting automatic operation of the clutch, associated with the vehicle engine in a manner to cause it to function at the proper time.

Still a further object of our invention is the provision of a simplified drive for motor vehicles wherein an automatic or self-operating clutch is associated with a fluid pressure or other power actuated device for controlling declutching during driving operations.

Still another object of the present invention is the provision of novel control mechanisms for automatic clutches permitting convenient external adjustment of the clutch clearance and providing take-ups for wear and permitting convenient adjustment of the speeds at which engagement and release of the clutch occurs without the necessity for getting at the interior of the clutch mechanism.

Further objects of the present invention will become apparent as the description thereof proceeds in connection with the accompanying drawings and are defined in the appended claims.

In the drawings,

Figure 1 is a longitudinal sectional view of one embodiment of an improved automatically operable or self-operating clutch forming part of our invention.

Figure 2 is a detailed sectional view of a means employed for keying the centrifugally actuated or automatic plate to the flywheel in the clutch shown in Figure 1.

Figure 3 is a detailed sectional view illustrating the method employed for keying the spring pressed positive plate to the flywheel cover plate in the clutch shown in Figure 1.

Figure 4 is a detailed view in section showing the positions taken by the parts when the centrifugal weights have rotated in response to rotation of the flywheel in the form of invention shown in Figure 1.

Figure 4a is a view in section of a modified form of spring assembly for use with the clutch shown in Figure 1.

Figure 5 is a longitudinal diagrammatic view, in section, of the clutch illustrated in Figures 1, 2, 3 and 4, associated with a throwout pedal and an adjustable linkage connecting it with the clutch mechanism and means for locking the clutch pedal in position for automatic operation, the parts in this figure being shown in the positions they assume when the engine is operating at idling speeds, or is stationary, and the clutch pedal has been unlatched.

Figure 6 is a view similar to Figure 5, showing the positions that the parts assume when the engine is operating at idling speeds, or is stationary, and the clutch pedal has been latched, or locked out of retracted or positive position.

Figure 7 is a view similar to Figure 6, showing the parts in the positions that they assume when the engine is operating at speeds substantially above idling speed.

Figure 8 is a view similar to Figure 7, showing the parts in the positions that they assume when the clutch pedal is manually depressed.

Figure 9 is a view showing one of the forms of latching means that are employed for locking the clutch pedal and positive plate out of positive and in automatic position.

Figure 10 is a detailed sectional view of an adjustable link which connects the clutch pedal and throwout shaft used in our invention.

Figure 11 is a view in elevation of an automatic clutch in combination with a transmission and free-wheeling unit and also showing controls therefor embodying our invention.

Figure 12 is a view of a modified form of clutch pedal adjusting mechanism with parts in section forming part of our invention.

Figure 13 discloses a mechanism for correlating the controls shown in Figure 11.

Figure 14 is a view with parts in section of a modified control coordinating device embodied in our invention.

Figure 15 is a view with parts in section of a modified form of our invention wherein fluid actuated means are employed for depressing the clutch pedal and controls therefor.

Figure 16 is a view with parts in section of a further modified form of driving assembly wherein fluid actuated means are employed for bringing the clutch pedal into automatic position and also a modified form of fluid actuated clutch pedal operator.

Figure 17 is a view in section of the control block employed in the modification of our invention shown in Figure 16.

Figure 18 is a detailed view, with parts in section, illustrating a modified form of means for adjusting the position of the clutch pedal shown in Figure 16.

With continued reference to the drawings, wherein like reference characters refer to like parts throughout the several figures thereof, a supporting member 1, suitably connected to an engine or other prime mover, is secured by means of bolts 2 to a clutch housing 3. Engine or driving shaft 4 extends into the housing 3 and is provided on the end thereof with a flange 5. Secured to the flange 5, in any suitable manner, as by bolts 6, is the web portion 7 of a flywheel 8. Flywheel 8 is provided on its periphery with the usual starting gear 9.

Disposed in axial alignment with the shaft 4, and mounted for rotation, is driven shaft 11, which is reduced at 12 at one end and journaled in a suitable anti-friction bearing assembly 13 secured in the flywheel web, and is adapted to have the other end thereof operably connected to a suitable gear changing apparatus for amplifying the torque applied to the final driven member. Driven shaft 11 has a splined portion 14 on which the correspondingly splined hub 15 is slidably mounted. Hub 15 is provided with a substantial flange 16 to which is suitably secured in any suitable manner, as by welding, riveting or the like, a relatively thin metal disk 17, which constitutes the driven clutch disk or member. Disk 17 has blades 18 struck out of the body thereof adjacent its junction with the flange 16. These blades, as shown in the drawings, are so disposed, that when the engine shaft rotates in the direction indicated by the arrow, a current of air will be drawn into the center of the clutch and forced by said blades to move outward over the clutch disk and parts for a purpose that will more fully hereinafter appear. Each face of disk 17, near the periphery thereof is provided with a facing 19 and 20, respectively, which may consist of any material that has the required characteristics to give the correct frictional gripping force, and at the same time has wearing qualities adapting it for this purpose. We prefer, however, to use the lubricated type of material disclosed in Heinrich Patent No. 1,979,880, embodying large percentages of graphite, which in practice has given very satisfactory results in a clutch of this character.

Frictional facings 19 and 20 may be secured to the disk 17 in any suitable manner, as for instance by means of rivets or the like. Each of the facings 19 and 20, cooperates with a suitable annular plate for effecting a driving connection between the driving shaft 4 and the driven shaft 11. Plate 22 engaging the facing 19, we term the automatic plate, and plate 23 engaging the facing 20 is termed the positive plate.

The construction of the automatic plate 22 and its actuating mechanism will now be described. Plate 22 has a peripheral strengthening rib 24 formed on one face thereof, and a rib 25 formed on the opposite face thereof in the region of the central hole therethrough. These webs give the plate rigidity, and prevent distortion or warpage thereof. Integral radial keys 26 are formed on one face of the plate and are integral at their inner ends with the strengthening web 25. The number of keys employed in a particular installation is determined by a consideration of the forces that they must transmit, and the heat transfer and spring pressure required in such installation. In the clutch shown which is for a Plymouth pleasure car, six equally spaced radial keys are used. The flywheel web is provided with radial slots 27 which slidably receive the keys 26. The walls of slots 27 form driving faces for engaging the keys and causing rotation of the plate 22 therewith. Each of the keys is bored and tapped to receive threaded hold back bolts 28. Disposed about bolt 28 and having one end thereof bearing against the bolt head is a compression spring 29. The other end of each spring 29 bears against a cup or like supporting member or washer 31 which abuts the rear face of the flywheel web and serves to bridge the key slot therein. While not absolutely essential, it is preferable to provide plate 22 with as many hold back bolts as there are keys, in order that a uniform hold back pressure may be exerted upon the plate. It will thus be seen that the hold back bolts uniformly exert pressure on the plate 22 and urge it toward the flywheel web tending to cause face 33 thereof to abut flywheel web 7.

Plate 22 is caused to move away from the flywheel web against the action of springs 29 for clutching purposes by means of a centrifugal mechanism responsive to speed variations of the flywheel. The centrifugal mechanism weights 34 are preferably segmental in shape to fit within the flange of the flywheel and preferably of the same number as the hold back spring bolts 28. Each weight 34 is provided with an inclined face 35 adapted to contact with the flywheel rim when they are in their extreme outward position. The weights are further provided with elongated rectangular lever sections 36 of substantial width, which extend through chordal slots 37 formed in the flywheel web between the key slots 27. Lever sections 36 carry at their extremities, heads 38, each provided with a flat face 39 that abuts the bottom face of an elongated rectangular bearing recess 41 formed in automatic plate 22. Heads 38 are also provided with faces 42 adapted to abut the surface of the flywheel web, the edge of which is designed for fulcruming engagement therewith during operation of the weights. The heads have their outer sides relieved to provide knife-like edges 43 which are adapted to fulcrum and seat in the dihedral angle defined by the bottom and side walls of recesses 41.

It will therefore be seen that as the speed of the flywheel increases each weight 34 will gradually swing outward about the edge 43 as a pivot in response to the rotation thereof. As this occurs faces 42 of the heads 38 will abut and slide on the flywheel web and the edge 43 will engage automatic plate 22 forcing the plate away from the web and into clutching engagement with facing 19 of disk 17. It will be noted that there is very little sliding engagement of parts in this arrangement since the contact at 43 is a knife edge pivotal contact. The sole sliding movement is at the edges of surfaces 42. This movement is small and little frictional resistance thereto exists so that the plate 22 is given a smooth and easy movement and clutch grabbing is avoided.

The mechanism associated with positive plate 23 will now be described. A combined housing and reacting member 44 is secured to the flywheel by a series of cap screws 45 which pass through collars 46 and are then threaded into the flywheel at 47. As seen in the upper part of Figure 1, the housing member 44 is provided with recesses 48 in which are seated compression springs 49 and 50 in turn seated at their other ends in recesses 51 and 52 formed in the rear face of plate 23. The springs urge the plate 23 towards the flywheel web and towards automatic plate 22 and clutch member 17. When positive plate 23 is assembled with the rest of the mechanism the springs 49, which are lighter and longer than the springs 50, are placed under considerable initial compression and the springs 50 are not placed under any compression, but are merely loosely disposed in their sockets for a purpose that will presently appear. Plate 23 is keyed to housing 44 by means of studs 23' which are rigidly secured to plate 23 in any suitable manner and are slidably mounted in apertures in housing 44.

The positive plate is withdrawn from the other clutch members against the action of the springs 49 and 50 by means of clutch fingers 54, which bear against a lug 55 secured to the rear of plate 23 in any well known manner as by bolts 56 or the like. Clutch fingers 54 are pivoted on pins 57 which in turn are secured to bolts 58. The bolts seat in recesses 59 formed in plate 23 at one end thereof, and at the other end are provided with nuts 61 rotatably journaled in apertures 62 formed in housing 44. Nut 61 is threaded on the bolt 58 and has means associated with it so that it may be locked in any selected position in well known manner. By rotating nuts 61, pivots 57 may be adjusted with relation to the clutch plates. After the initial adjustment of clutches at the factory all service adjustments for plate wear may be made externally of the clutch as will be pointed out hereinafter.

Clutch fingers 54 are provided with curved faces 63 which cooperate with a clutch throwout bearing assembly denoted generically at 64, mounted on a sleeve member 65, in turn slidably mounted on a stationary hollow supporting member 66 through which the shaft 11 extends. Sleeve member 65 is urged to retracted position by means of a tension spring 67 which is secured thereto, and at the other end to a lug 68 formed on the housing 3. This spring is relatively light since its sole function is to keep the bearing assembly 64 out of contact with the fingers 63. Sleeve 65 is moved toward the clutch fingers against the action of spring 67 by means of lever members 69 which have curved extremities 71 abutting cooperating faces 72 formed on sleeve 66. Lever 69 is keyed by means of pin 73 or the like to a shaft 74, upon which is mounted, exteriorly of the clutch housing, a conventional clutch throwout pedal (not shown).

The operation of the structure so far developed will now be described. As the flywheel is accelerated, the weights 34 will gradually swing out and pivot about the point 43, the edge of face 42 of head 38 will engage the flywheel web forcing the automatic plate to be moved away from the web against the action of the springs 29. Due to the resisting action of springs 29, the movement of the weights will be under control, and there will be no tendency for them to vibrate or undergo other undesirable movements. When the speed is sufficiently great, automatic plate 22 will engage facing 19 of driven clutch member 17. Upon further movement of the automatic plate clutch member 17 will slide longitudinally of the shaft 11 on splines 14 and 15. Facing 20 of clutch member 17 will then be brought into contact with positive plate 23. The portion of the operation that has just been described, will be termed hereafter as the first clutching stage.

The second clutching stage is initiated when facing 20 first contacts the face of the positive plate 23. As the pressure on positive plate 23 is further increased, springs 49, which are under substantial initial compression, resists the weight and plate movements and a torque of small magnitude is initially transmitted to the driven shaft 11. As spring 49 is further compressed the magnitude of the torque transmitted is gradually increased and shaft 11 is picked up evenly and without grabbing, with a slipping drive. When spring 49 has been sufficiently compressed so that spring 50 comes into play, the second stage of operation may be said to be at an end and the third stage commences. While the second and third stages of operation merge into each other insofar as actual operating characteristics are concerned, they are distinct to some extent in that full driving couple is not established until spring 50 is under substantial compression, at which time the third stage of the clutching operation may be said to be complete. The plates are then in firm driving engagement with each other and there is no slippage between the driving shaft and driven shaft.

In Figure 4a, a modified form of spring assembly is shown associated with the positive plate. Spring 49 is placed under an initial compression as in the previous form of the invention and spring 50, instead of resting loosely in its recesses, is held under compression by means of retainer element 44' held in place by a bolt 45' and nut 46'. The parts are shown in this figure in automatic position, and it is seen that spring 50 cannot exert any pressure on the positive plate until the centrifugal mechanism has moved the automatic and positive plates against the action of the holdback springs and springs 49, to the position where the positive plate contacts the head of bolt 45'. When this occurs the third clutching stage is initiated, and the entire action is similar to that explained in connection with the first form of spring assembly, except for the fact, that spring 50, in being held under compression offers substantial resistance when contact of the plate and bolt head occurs, hence the third clutching stage of this device gives a quicker torque pick up than that obtained with the first form described.

In connection with both of these devices it will be noted that when the clutch plates are disposed in their positively engaged positions, the only force tending to hold the plates together is that caused by springs 49. This is not a disadvantage however, because the clutch is only employed in this manner to turn the engine over by towing or coasting the vehicle for starting purposes, and since the plates are stationary with respect to each other when initially engaged, the static friction is sufficient to prevent slippage under these conditions.

In the automatic clutches that have been heretofore proposed, the positive plate is backed up by a series of single springs, and accordingly, no staging of engaging pressures is effected in such devices. In the only types of slipping clutches that have been commercially successful in automotive drives the clutch facings have been a special lubricated material having low coefficients of friction under low pressure, which gradually rise as the engaging pressure is increased, until, when full torque is being transmitted and no slippage exists, the coefficient of friction is fairly high. However, even at the upper limits, the coefficients are substantially below those of clutch facings in comparable conventional manually operable clutches requiring the use of heavy backing springs to produce the proper frictional grip in such automatic clutches. The small available range of movement of the clutch plates between their fully engaged and disengaged positions, together with the necessary limitation of maximum pressures to permit convenient manual declutching of a practical automotive clutch, limits the available pressure differences between disengaged and fully engaged or non-slipping drive position to a comparatively narrow pressure range when a single series of backing springs is used. This necessitates the use of higher coefficients of friction when a single series of backing springs are used than is necessary with our improved clutch so far described embodying the multiple series of backing springs, since with our improved multiple spring arrangement, with the same movement of the automatic plate available, the initial engaging pressures may be materially lowered, and much higher final engaging pressures may be secured. The lowering of initial engaging spring pressures secured by our improved construction permits easier manual declutching operations due to the lighter spring pressures at speeds where normal shift operations are performed in motor vehicle control, and permits the use of clutch facings containing larger percentages of lubricant and lower coefficients of friction with the same automatic plate movement, as compared to the prior clutches embodying a single series of springs backing the positive plate. The lowering of coefficients of friction of the facing material secured in our improved clutch gives a smoother pick-up in slipping drive and longer clutch life. The use of the multiple springs to build upon the operating pressures in stages permits a relatively slow building up of pressures at the lower clutch speeds when the clutch is picking up the load, and a rapid building up of pressures after the load is moving to secure a non-slipping drive, even with clutch facings containing as high as fifty to sixty percent or more of graphite in the original mixture from which the clutch facings are formed. Accordingly, while prior automatic clutches with a single series of backing springs have been found commercially practical, our improved clutch gives a materially improved smoothness in slipping drive, increased life, and easier normal declutching operation.

It will be noted that the fulcrum edges 43 of the weight levers as shown in Figure 1, are disposed approximately midway between the inner and outer periphery of plate 22, and hence the weight levers act upon the automatic plate in line contact and for a substantial distance along the face thereof, applies substantially uniform pressure opposite the center of the engaging faces insuring freedom from warping and twisting of the plates under the pressures of operation. Uniform distribution of springs 49 and 50 around the positive plate provides uniform spring reactions for the clutch plates.

The operation of the clutch when taken in connection with the manual throwout means will be discussed in detail hereinafter in connection with Figures 5, 6, 7 and 8 of the drawings, the parts in Figure 1 being shown in the position that they assume when the clutch pedal is fully retracted and the clutch plates are in positively engaged or manually clutched position, and the engine is rotating at idling speeds, or is stationary.

Since slippage is inherent in the operation of a clutch of this type, solid lubricant is free from the facings during operation. This freed material should be eliminated, and to this end means are provided for ventilating the clutch. The clutch housing 3 is provided with an aperture 75, in which is mounted a suitably shaped air deflecting member, or funnel 76, the lower end of which terminates as near as possible to the axis of rotation of the clutch members. This arrangement also cools the slipping clutch. As a further aid in radiating the heat and to prevent distortion due to widely varying metal sections, plate 23 which is relatively large for purposes of giving it inherent strength and rigidity, is cored out wherever possible as indicated at 77. The air flow induced by the action of the fan blades 18 is drawn into the funnel member 76, and along the shaft 11 towards the clutch plates. A portion of the air stream, when the plates are disengaged passes between the facing 19 and the plate 22 and the plate 22 and the flywheel web 7 on one side of the plate 17 and on the other side of the plate the air passes between the facing 20 and the plate 23 removing dust and solid free lubricant in the air stream. A stream also passes through the various cored sections 77. The air passes over the facings and the entrained dust is exhausted from the clutch structure into the clutch housing space by means of the apertures 78 formed therein, while the air stream which passes through cores 77 is exhausted through apertures 79 and 80 which are formed in reacting member 44. The fan blades 18 are made of a sufficient size and are inclined at the proper angle to produce the required air current through the clutch mechanism. However, if desired the fan blades may be eliminated and the rotation of clutch parts may be relied upon to induce the cooling circulation.

While it is to be understood that the fan blades or impeller elements could be mounted on one or both of the plates 22 and 23, it is preferable to strike them out of member 17, so that the air is taken from the side of the flywheel opposite the engine to avoid building up a sub-atmospheric pressure adjacent the pilot bearing, sufficient to draw oil from the engine crankcase, and is distributed on both sides of the plates and hence the dissipation of heat from each side is approximately equal. Therefore, warping or distorting tendencies produced by uneven expansion of the metal which in turn is caused by non-uniform heat contact thereof are avoided, for the reason that the entire area of each of the plates is maintained at a substantially uniform temperature.

While the heated air may be withdrawn or exhausted from the clutch housing 3 by providing suitable apertures therein, we prefer to provide a suitable valve for controlling the air since it is desirable in cold weather to vary the dissipation of heat from the clutch parts due to the fact that the frictional coefficients of the facings decrease as the temperature increases, and by controlling the temperature properly the clutch operating characteristics may be varied or controlled. For this purpose an aperture 82 is formed in the upper portion of the clutch housing, and a flanged valve member 83 secured thereto by means of suitable fastening elements such as screws 84. Hinged to this valve member, as at 85, is a flap valve 86 having an apertured ear 87 provided thereon. Pivoted in ear 87 is a wire member 88 which is housed in a flexible member 89. The wire and housing members form a part of the well known Bowden wire construction and it is intended that the upper end of the housing 89 be mounted on the vehicle dashboard or the like for convenient manipulation by the vehicle operator. The operator of the vehicle then can thus readily adjust the flow of air through the clutch and thus properly control the dissipation of heat from the clutch parts regardless of the temperature of the surrounding air, and since the coefficient of friction is dependent upon the temperature, smooth satisfactory operation of the clutch may be assured.

From a consideration of the structure developed so far, it will be seen that automatic plate 22 is moved by the centrifugal weights a certain distance, which is limited by contact of the weights with the flywheel web. Accordingly, if at this time, the positive plate can be moved to the right sufficiently so that the clutch member 17 will not be clamped between it and automatic plate 22, no driving effort can be transmitted from the driving to the driven shaft even though the centrifugal weights are in their outermost position. Moreover, if positive plate 23 is allowed to move to the left sufficiently to clamp the clutch member 17 between it and the positive plate with sufficient pressure when the positive plate is in retracted position with the centrifugal weights in the position they would take when the engine is idling or stationary, it will be seen that a driving connection will be secured. Such operation is desirable for instance, in winter or when the battery is low to connect the clutch driving and driven members with the engine dead so that the car can be pushed or coasted in order to turn the engine over.

For this purpose in Figure 9 we have disclosed a locking means which comprises latch member 90, provided at one end with a clutch pedal engaging dog 91, and at its other end pivotally connected at 92 to a suitable support 93, which may be secured to a stationary part of the vehicle such as 94 in any well known manner as by rivets 95 or the like. Secured to the latch member 90, adjacent the pivot thereof is a laterally extending finger 96 apertured to receive a control wire 97 clamped in the aperture by means of a set screw 98 or the like. Wire 97 is held and guided in a suitable flexible Bowden casing 99, which is led to a suitable operating location in the interior of the vehicle, for instance, to the upper end of the vehicle steering column 101 or the like. A friction control member 102 is secured to the steering column by means of a suitable bracket 103 and serves to hold the wire in any selected adjusted position.

Provided on the end of the wire 97 is a suitable operating knob 104 for operating clutch pedal locking means. It will therefore be seen that the clutch pedal when disposed in the position shown in Figure 9, will hold the clutch fingers in such a position, that when the centrifugal weights are in their innermost or retracted position the clutch members will be disengaged, as when the engine is idling or stopped. This condition is shown in Figure 6 wherein a clearance is illustrated between the plates. When the clutch pedal is locked in this position the clutch is in automatic operating condition. In this condition with the engine at or below idling speed the clutch plates will be disengaged and upon accelerating the engine above idling speeds the clutch members will be gradually engaged by the increasing pressure applied by the centrifugal mechanism.

To readily adjust the linkage connecting the clutch pedal and the throwout fingers, and thereby adjust the clearance between the clutch plates when the clutch pedal is held in automatic position, we have provided a mechanism that may be operated from the interior of the vehicle. Keyed to shaft 74, which carries lever 69, is a lever 105 pivoted at the end thereof to a pair of ears 106 of the casing 107 of the adjustable link assembly. The details of this adjustable link assembly are shown more clearly in Figure 10. Casing 107 threadedly receives a thrust member 108 which is screwed down against an antifriction bearing 108' which in turn rotatably holds a disc member 109 in position in the casing. Keyed to disk 109 is shaft 111 to which locking disc 112 is rigidly secured. Disc 112 has notches 113 formed in the periphery thereof, which cooperate with a spring latch 114, secured by rivets 115 or the like to the side wall of casing 107. Accordingly, when shaft 111 is rotated disk 109 will be rotatably held in the casing and the shaft 111 is yieldingly locked in any desired position by means of the spring 114 and disc 113. Shaft 111 is threaded at 116 to receive tapped pin 117. Journaled on pin 117, and straddling shaft 111, are a pair of lever members 118 keyed to the clutch pedal shaft 119 for rotation therewith. The upper end of the shaft 111 is provided with a screw driver slot 121, or any other suitable tool engaging means. To adjust the clutch, a screw driver is inserted through slot 122 formed in the floor board and engage it with the slot 121 in shaft 111, and shaft 111 is rotated in the desired direction, moving pin 117 up or down thread 116. The link is accordingly lengthened or shortened as desired, and during this operation the clutch fingers are accordingly moved toward or away from the thrust bearing to establish proper clearance of the clutch plates for automatic operation.

In Figures 5, 6, 7 and 8, we have disclosed the clutch and its associated controlling mechanisms in their various major operative positions. The disclosure of the clutch in these figures is very diagrammatic to clearly disclose the relation of the clutch plates and parts with respect to each other during the various positions of the control members.

In Figure 5 the parts are shown in the positions that they assume when the clutch is in what we term the positively engaged position. The automatic plate 22 and the weights 34 are seen to be in retracted position assumed when the engine is operating at or below idling speed or is stationary. The positive plate 23, due to retraction of bearing 64 because of the unlatched position of latch member 90, is in frictional engagement with the clutch member 17 under the influence of springs 49 and 50. If the engine is stationary at this time, and it is desired to start it by means of coasting or towing the car, this may be done because a direct drive exists between the driving and driven shafts.

In Figure 6 the parts are disposed in what we term the automatic disengaged position. Automatic plate 22 and weights 34 are in their retracted positions as shown in Figure 5, however, positive thrust bearing 64 engaging the clutch fingers has retracted the positive plate 23 from clutch member 17 against the action of its actuating springs. The parts are held in this position by latch 90 which is engaged with the clutch pedal 120. When installing our improved clutch in a vehicle, the parts are locked in this position for adjusting the connection between the clutch pedal and the throwout fingers. A screw driver is inserted in the slot 121 as explained above and the shaft 111 rotated sufficiently, and in a proper direction to withdraw plate 23 and give ample clearance between it and the other plates while the motor is stationary or operating at idling speeds. To ascertain when the adjustment is correct, the vehicle brakes are released and the shaft 111 rotated until the engine, when idling, is felt to transmit a small amount of torque to the rear wheels. The shaft 111 is then rotated in the opposite direction until the plate 23 no longer delivers torque. During the rotation of shaft 111, spring finger 114 rides into and out of the various notches 113 in the disc 112, and when the adjustment is completed, disc 112 is yieldingly held in adjusted position thereby.

With the parts in the position shown in Figure 6, if it is desired to start the vehicle, and the vehicle is on level ground, the transmission is placed in high gear and the engine accelerated. As the engine gains speed the weights 34 gradually swing out, and cause automatic plate 22 to move toward and engage and force clutch member 17 against positive plate 23. The clutch then, under automatic operation, transmits a gradually increasing driving torque to the rear wheels and the vehicle is started. When the vehicle, and consequently the engine, attains sufficient speed, the weights will have swung out to their furthermost limits and the plates will be in tight engagement with no slippage between them, and a direct drive from the driving to the driven shaft is effected. The parts will then be disposed in the positions that they are shown in Figure 7. If during this automatic engaging operation, the centrifugal mechanism causes engagement before it should, due to the close disposition of the plates 22 and 23, this may be readily remedied by backing plate 23 away from the automatic plate by manipulating shaft 111 in the proper direction. When operating the vehicle in this manner, all that is necessary to bring it to a stop, is to release the accelerator and apply the brakes. When the vehicle has decelerated to a speed that corresponds substantially to engine idling speed, the centrifugal mechanism will release the clutch, and the vehicle may be brought to a complete stop by continued application of the brake. Or, if traffic conditions permit, the accelerator may be depressed and the engine speed accelerated causing almost immediate reengagement of the clutch, and the vehicle will be picked up in high gear.

In Figure 8 the centrifugal mechanism is shown in its outward limit, with the automatic plate moved to the right against the action of its holdback springs, while the positive plate has been backed away from the remaining clutch plates by manual depression of the clutch pedal. Hence, there is no contact between the plates, and no driving connection between the driving and driven shaft. In traffic, when it is desired to get the car away quickly, and in starting on steep grades, the clutch pedal may be operated in this manner to disengage the clutch between each gear shifting operation as in a vehicle which is provided with a conventional type of manually operable clutch.

In connection with the device so far developed and especially with respect to Figure 8, it will be seen that we have provided a device which provides controlled free-wheeling without the necessity of interposing a free wheeling unit between the engine and final drive. Assuming that the vehicle is operating in high gear and at a substantial speed, all that is necessary to free wheel is to release the accelerator and momentarily depress the clutch pedal as shown in Figure 8. At this instant the parts will appear as shown in Figure 8, but shortly thereafter, due to the engine dropping to idling speed, the weights will assume the position shown in Figures 5 and 6. The clutch pedal is then released and returned against the latch face 91. The car will then coast as there is no torque transmitting connection between the engine and the rear wheels. When it is again desired to drive the vehicle under engine power, all that is necessary is to accelerate the engine, which will cause the contrifugal mechanism to reengage the clutch members.

In Figure 11 we have disclosed a clutch of the character above mentioned in combination with a conventional automotive vehicle transmission 124, having a shifting lever 125, and which is of the type wherein there are provided three speeds forward and reverse, and a free wheeling unit 126. This unit is of the type having an overrunning clutch mechanism and a positive clutch, the positive clutch mechanism being provided with an operating lever 127 which may be shifted from the full line position, wherein overrunning operation is secured, to the dotted line position where the free wheeling is locked out and a direct driving connection to the vehicle wheels is secured. Connected to the free wheeling unit is a coupling member 128 which may be connected by means of a propeller shaft in any suitable manner to the final driving mechanism.

In this construction, clutch throwout shaft 74 is extended outwardly of the clutch housing 3 and has clutch pedal 129 rotatably mounted thereon, and also a slotted arm 131 fixed thereto by means of a key 132 or the like. Arm 131 is provided with a curved member 133 which has an arcuate slot 134 formed therein about shaft 74 as an axis. Clutch pedal 129 threadedly receives a bolt 135 which when clamped up, causes unitary movement of the clutch pedal and the arm 131. This structure provides a modified means for adjusting the position of the clutch pedal with respect to the shaft 74.

Bracket 136 is secured to the clutch housing in any suitable manner as by bolts 137 or the like. Upon this bracket is bolted or riveted a clutch pedal lockout assembly of the type disclosed in Figure 9 of the drawings, for which control member 138 thereof mounted on the dashboard of the vehicle and is provided with an operating knob 139.

Bracket 141 is secured to the free wheeling unit by means of screws 142 or the like and clamped at its upper end is a control housing 143. Formed on the free wheeling control lever 127 is an apertured ear 144 which receives the wire 145 extending from Bowden casing 143. A set screw 146 or the like is used to hold the wire 145 in adjusted position within the ear. Flexible casing 143 extends up and through the dashboard and has a frictional adjusting member 147 associated therewith. Wire 145 has an operating knob 148 provided thereon purposely made of a different size and character from the knob 139, so that they may be readily distinguished by the operator of the vehicle without taking his attention from traffic conditions.

With the structure just described, the vehicle may be operated in the manner that has been outlined above in connection with the driving assembly that was not provided with a free wheeling mechanism, and in addition may be operated and the gears shifted without touching the clutch at all. If the free wheeling unit is in the full line position shown in Figure 11, and the clutch pedal is locked down to its full line position, and the vehicle operator desires to start the vehicle in low gear, all that he need do is to shift the transmission into low gear, since at this time the clutch plates are disengaged as shown in Figure 7. The engine is then accelerated and as the clutch mechanism reaches engaging speed, the centrifugal mechanism will cause the clutch members to gently take hold and start the vehicle.

When the vehicle has attained sufficient speed to shift into second gear it is not necessary to operate the clutch pedal to bring the engine to idling speed. All that you need do is release the accelerator and the engine is disconnected by operation of the free wheeling or over-running clutch in well known manner, and the shift into second gear may be effected without touching the clutch pedal. When sufficient vehicle speed has been attained in second gear, the same operation is repeated to shift the transmission into high gear without necessitating clutch pedal operation. It will be noted that if the shift operations are performed slowly, the transmission mechanism comes to rest or substantially since the centrifugal mechanism will release the self-operating clutch at idling speed, and the transmission then has no driving connection at either end with any moving parts until the engine is again accelerated. Accordingly, with proper operation, gear-shifting is made extremely easy by our invention and no clashing occurs without the use of synchro-mesh transmission constructions. The organization of the parts just described, it will be seen provides a driving mechanism that is extremely simple, requires no manual operation whatever, and is practically fool-proof.

When it is desired to use the engine as a brake, as in descending steep grades, or to secure reverse drive, knob 148 may be pulled out, or lever 127 may be actuated directly to its dotted line position to lock the free wheeling over-running clutch and establish a direct drive from the transmission to the rear wheels until the engine drops below idling speed.

When it is desired to turn the engine over by coasting or towing for starting purposes the over-running clutch is locked and knob 139 may be drawn outwardly unlocking the latch 90 so that the clutch pedal 129 is allowed to move into its retracted or positively engaged position, and a direct drive is thus provided to the vehicle wheels.

In Figure 12 there is shown a modified form of clutch pedal adjusting mechanism. Rotatably mounted on clutch throwout shaft 74 is a clutch pedal 151 with a portion 152 thereof extending downwardly beyond the pivot. A casing 153, having apertured ears 154 formed thereon is secured to the clutch pedal by means of bolts 155 or the like. Disposed within the casing is a worm gear 156 mounted on the shaft 74 and secured by means of the key 157. Gear 156 meshes with worm 158 journaled at one end in socket 159, and at the other end in a plug 161 threaded into the casing. Worm 158 is provided with shank portion 162 slotted at 163 for the reception of a screw driver or other suitable operating tool. Secured to the shank portion of the worm is a spring detent 164 which cooperates with suitable ratchet teeth 165 provided on the outer face of the plug 161. By inserting a screw driver in the slot 163 and rotating the worm, gear 156 will adjust the clutch pedal with respect to shaft 74, and the clutch plates with relation to latch 90. During these operations the spring detent 164 will ride into and out of the teeth 165 and when the adjustment is complete the detent will yieldingly hold the worm in its final adjusted position. This provides a very convenient adjustment as the engine hood may be raised from the side of the engine where the clutch is located and the screw driver readily inserted in the slot 163 and properly manipulated.

In Figures 13 and 14 we have disclosed devices for coordinating the movements of the controlling members for the free wheeling unit and the clutch pedal latching means. Referring to Figure 13, clutch pedal latch control housing 99, and free wheeling control housing 143, are brought up and clamped on a block 167 by means of suitable clamping members 168. Block member 167 may be mounted in any suitable location in the vehicle, but is preferably mounted on the partition that separates the engine compartment from the driving compartment. Pivoted on pin 169 on the block is lever 171. The actuating wires contained in casings 99 and 143 are passed into apertures in this lever and clamped in place therein by means of set screws 172 or the like. Lever 171 is caused to swing about its pivot by means of a wire 173 that is held in place in an aperture therein by set screw 172, and is received by Bowden casing 174 clamped to the block by means of a clamp member 175. Housing 174 extends through vehicle dashboard 176, and is provided with a suitable friction control member 177 adapted to hold the wire 173 in its extended or retracted position. A suitable operating knob 178 is provided on the end of wire 173.

It will be seen, that by pulling out the knob 178 and thus rotating lever 171 about its pivot, the over-running clutch will be locked in positive driving position and clutch pedal latch 90 will be disengaged from the clutch pedal 129 to allow it to drop back into its positive position. This is, in effect, the same result that would be obtained in the modification previously described if both the knobs 139 and 148 are simultaneously pulled out, which effects a direct drive to the rear wheels of the vehicle.

In Figure 14 is shown a further modified form of coordinating mechanism for the free wheeling unit and clutch pedal controls. The vehicle dashboard 181 is apertured and a sleeve 182 is inserted therein. Sleeve 182 is provided with a flange 183 which bears against the front face of the dashboard, and nut 184 is threaded on the sleeve and bears against the rear face of the dashboard to securely hold the assembly in place. Slidably mounted in the sleeve 182 is an operating member 185 which is provided with an operating knob 186. The operating member 185 is held in its selected operating position within the sleeve by means of a spring pressed ball 187 that is adapted to seat in notches 188 formed in the interior wall of the sleeve. Frictionally fitted in a bore in member 185 is sleeve 189. Slidably received within sleeve 189 is a control member 191, which carries at its end an operating knob 192. Control member 191 is provided with a flange 193 which abuts top face of the control knob 186. Control member 191 is reduced in section and apertured at its lower end 194, which aperture receives the free wheeling unit actuating wire 145 associated with the housing 143.

Clutch pedal latch 90 is controlled by means of a stud 195 threaded into member 185. Actuating wire 97 is inserted in an aperture in the stud 195 and is held therein by means of a set screw 196. Housings 99 and 143 may be adjustably clamped in position behind the dashboard in any suitable manner as a bracket or the like, however, no bracket is shown in order that the structure of the control mechanism may be more clearly illustrated.

From the structure just developed, it will become apparent, that by actuating knob 192 the free wheeling or overrunning clutch will be locked and a positive drive will be effected from the transmission to the vehicle wheels. This operation is desirable in heavy traffic or in driving down steep grades when the operator desires to use the engine for braking purposes. For instance, if the vehicle is proceeding towards an intersection and the way is blocked to traffic, he need merely release the accelerator and depress the brake pedal, and the brake operation together with the braking effect of the engine, will rapidly decelerate the vehicle until the engine speed substantially corresponds to idling speeds. When this speed is reached the automatic clutch will disengage and the vehicle will come to rest upon continued application of the brakes. In the open country driving where it is not desirable to utilize the engine braking effect, knob 192 will be pushed in to render the automatic free wheeling unit operative.

During vehicle control operations in which it is desired to lock out the self-operating clutch mechanism to effect a direct drive from the engine to the transmission, and at the same time to lock the over-running clutch so that a direct drive may be obtained from the transmission to the rear wheels of the vehicle, both lockout operations may be effected simultaneously by actuating knob 186. Knob 186 through its connection with the actuating wire 97 and due to the fact that the shoulder 193 abuts the front face of knob 186, will move control knob 192 in unison therewith. Accordingly, when the knob 186 is moved outwardly, control wires 97 and 145 are actuated which in turn actuate their respective devices. This simultaneous control is actuated when it is desired to turn over the engine for starting purposes by coasting or towing the vehicle.

The automatic or self-operating clutch that has been just described, in combination with the controls therefor, has been found in practice to give an increased vehicle mileage per gallon of fuel used, and contributes materially to the useful life of the vehicle in which it is installed. Its use has also brought about a material reduction in the maintenance cost and replacement of drive mechanism parts due to the smoothness with which it takes hold, and its entire operating characteristics adapt it for the traffic conditions of today.

In very heavy vehicles, such as busses, trucks and rail cars, that are not provided with a free wheeling mechanism, it is necessary to depress the clutch manually in order to shift gears. In large vehicles this is a very laborious task in view of the heavy clutch pressures that are employed. To overcome this disadvantage for heavy vehicles, and to give a maximum ease of control for vehicles of all classes, while retaining the desirable operating characteristics of our improved automatic clutch, we have disclosed in Figure 15 a fluid pressure actuated operator for the clutch pedal. In this figure, an internal combustion engine is indicated diagrammatically at 201 connected to clutch housing 3, in which is mounted an automatic or self-operating clutch of the type disclosed in Figures 1 to 4 of the drawings. Mounted on the rear end of the clutch housing 3 is a conventional transmission 203, provided with the usual gear shifting lever 204.

Clutch throwout shaft 74 has rigidly mounted thereon clutch pedal 205 and a short lever 206 provided with pin 207. The clutch pedal is shown locking in its full line or automatic position by means of latch 90, which has been previously described in connection with Figure 9 of the drawings. A fluid pressure actuated device, having a divided casing 208 is illustrated in the drawings for causing depression of the clutch pedal at the will of the operator. This casing is secured to the side of the engine or any other suitable support by means of suitable lugs 209. The two halves of the casing 208 are clamped together by means of bolts 211 or the like, and clamped between them is diaphragm 212. The diaphragm is disposed between two plates 213, and clamped by means of suitable nuts 214 which are threaded on the ends of actuating rod 215. Rod 215 passes loosely through an aperture 216 in the diaphragm casing, and at the other end is enlarged and provided with a slot 217, in which pin 207 is adapted to slide. Rod 215 is urged to the left by a light spring 218 for a purpose that will presently appear. When actuating rod 215 is moved to the left, it will engage pin 207 and cause the clutch pedal to be depressed. Rod 215 is actuated by mechanism that is about to be described.

A control valve block 219 is secured to the engine block adjacent the intake manifold 221 thereof. Block 219 is bored out vertically at 222, and this bore communicates at its lower end, by means of pipe 223, to the interior of the diaphragm casing, and at the upper end is connected by means of a pipe 224 to the engine intake manifold. Accordingly, the intake manifold and the diaphragm casing are in fluid communication with each other by means of the bore 222, and control of the flow of fluid through this bore is effected by means of valve members 225 and 226, which are slidably mounted in transverse bores in the blocks which intersect the vertical bore. The construction of these valve members is identical, each being provided with a longitudinal bleeder slot 227 and a reduced portion 228. The parts are so constructed that when either or both of the valve members is disposed in the position shown, the interior of the diaphragm casing will be in communication with the atmosphere. With valve member 226 disposed to the right in the drawings instead of the position shown, atmospheric air would pass through the bleeder slot 227 in the upper valve member and downwardly in the bore 222 and thence through the reduced portion 228 of the lower valve member to the diaphragm casing. These valve members and their respective bores are preferably ground to fit in fluid tight relation.

Valve member 225 is pivoted to a link 229 which is pivoted to lever 231. Lever 231 is pivoted to a stationary support 232 at one end thereof, and at the other end to engine throttle controlling rod 233. Also pivoted to lever 231 is one end of link 234 connected at its other end to an accelerator pedal 235 pivoted in the vehicle at 236. The purpose of this connection is to place the interior of the diaphragm into atmospheric communication whenever the accelerator is depressed. Valve 225 is pivoted to a short link 237 which in turn is pivoted to a lever 238. Lever 238 is pivoted at 239 to any suitable stationary support and carries also at its end a link 241, which is secured to pedal 242. Pedal 242 is pivotally supported on clutch housing 3 by means of a bracket 243, and is held in retracted position by means of a tension spring 244.

Lever 238 is slotted at 245 to receive the end of actuator wire 246 of a well known Bowden wire control casing 247 which is suitably supported adjacent the lever by means of a clip 248 or the like. Bowden wire casings 247 and 99 are brought up to a suitable location in the vehicle and secured to control block 167 and wires 246 and 97 are connected to the mechanism for producing simultaneous movement as shown in Figure 13, and previously described in detail.

In operation of this form of invention, the parts, as they are illustrated in their full line position, show the clutch pedal disposed in its automatic position, pedal 242 released, and the accelerator positioned so as to hold the carburetor throttle partly open. Actuating rod 215 is in its mid-position due to the atmospheric communication with the diaphragm casing existing at this time. To shift the transmission into first gear, the operator releases the accelerator, closing the throttle and shifting valve 226 to the right in Figure 15. At the same time pedal 242 is depressed by the foot of the operator, moving valve 225 to the right. This movement of the valves cuts off atmospheric communication and places passages 228 of valves 225 and 226 in communication with bore 222 of block 219 establishing communication of pipe or tube 223 with the intake manifold. The interior of the diaphragm chamber will then be exhausted, and due to the atmospheric pressure acting on the other side of diaphragm 212, the diaphragm will move to the left, actuating link 215 to depress the clutch pedal and disengage the clutch. The operator then may shift the gears. To reengage the clutch, he need not release pedal 242, but may merely depress the accelerator, placing the diaphragm chamber into atmospheric communication through operation of valve 226 as above explained, and permitting the clutch parts to return from disengaged to automatic engaging position with the clutch pedal reengaging hook 90.

The engaging movement of the clutch in moving to automatic engaging position is relatively rapid, and is not retarded in the manner that is necessary with vacuum clutch operators of today. The return movement is only under the control of the slight cushioning effect caused by the air passing through the only slightly restricted passages 227 in the valve members and no restriction to secure very slow final engagement is used. This relatively rapid return movement of the clutch pedal does not cause the clutch to engage since the engine is at idling speed, and the centrifugal weights are in their innermost or retracted position and the clutch members are disengaged. Upon depression of the accelerator, the engine, through the throttle connection, is caused to accelerate sufficiently to cause the centrifugal mechanism to cause engagement of the clutch plates to start the vehicle in the manner above described. When the vehicle has reached sufficient speed, the accelerator is released, again moving valve 226 to the right, and with pedal 242 depressed by the foot of the operator, the partial vacuum produced by the intake manifold in the diaphragm chamber immediately causes clutch disengagement, and the transmission may be shifted into second gear. By the time the operator has properly shifted from first into second speed, the engine will have reached idling speed and the centrifugal mechanism will have caused separation of the clutch members. The accelerator is then depressed causing first, restoration of the clutch parts to automatic engaging position, and then engagement of the clutch parts by operation of the centrifugal weights as explained before. The operations are then repeated to get into high gear.

This structure eliminates all direct manual clutch operation, and at the same time avoids complicated clutch retarding mechanisms that have previously been necessarily employed with vacuum operated clutches. Moreover, in shifting from low to high gear the operator need only keep his foot on the pedal 242, and need not, although he may, repeatedly depress and release it, since movement of the accelerator controls clutching and declutching operations through its interconnections with the valve 226.

If the operator desires to effect a direct drive to the rear wheels of the vehicle when the engine is stationary or only operating at idling speeds, he may pull out the button 178 which will unlatch member 90 and at the same time swing the lever 238 to operate the valve 225 placing the interior of the diaphragm casing into fluid communication with the atmosphere. In this connection it will be noted that it would be very undesirable to allow pneumatic operation of the clutch while the latch 90 was in its unlatched position, since depression of the accelerator in this condition of parts would cause the rapid return movement of the clutch that has been previously described, and would cause too rapid engagement of the clutch members. This improper mode of operation is effectively prevented by our improved arrangement since as soon as the operator depresses pedal 242 through the interconnections of lever 238 and control wire 246, the latch is back into its latching position. Although at this time the clutch pedal is still in its positive engaged position, on the first return stroke after depression, it will engage latch 90 and positive engagement of the plates can not be effected.

The clutch pedal, when in positive position, is still under control of the diaphragm in view of the fact that the stroke of the actuating rod 215 is equal to that necessary for bringing the pedal from automatic to depressed position, plus the distance from positive to automatic position. Hence, the diaphragm is shown in its mid-position. Light spring 218 is employed for keeping the pin 207 in tight engagement with the end of the slot in the rod 215.

It is therefore seen that this device has the further advantage of being practically fool-proof and cannot be inadvertently abused.

In connection with the device that has just been described, it will be understood that a piston and cylinder could be substituted for the diaphragm device which has been shown, and any other valve assembly having proper characteristics could be used instead of that which has been illustrated in connection with this device. Moreover, the pedal 242 could be replaced by a Bowden wire control having a dash button, and such a structure is very satisfactory in practice. In such a construction, the button need only be pulled out at the initiation of the shifting operation and left in that position as long as desired, since the accelerator when depressed, operates valve 226 to place the interior of the diaphragm casing in communication with the atmosphere. If the pedal 242 or the control button that has just been described, is left in operative position during driving in high or any other gear, automatic free wheeling will occur whenever the accelerator is released. Free wheeling is effected by means of the accelerator shifting the valve 226 to the right and since valve 225 is already held in that position by the pedal or button, it is obvious that the clutch will be disengaged by means of the vacuum operator whenever the accelerator is allowed to be retracted. When controlled free wheeling is desired, pedal 242 need only be depressed and the accelerator released sufficiently to permit the engine to drop to idling speed when the centrifugal mechanism will release the clutch members, after which the pedal 242 may be released and the vehicle will coast until the engine is again accelerated.

For sake of clarity of illustration, we have illustrated the latch 90 as cooperating directly with the clutch pedal 205. In practice, however, it will be understood that it may be desirable to have this latch, along with the actuating member 215, cooperate with a member independently of the clutch pedal in order that movement of the clutch pedal will not be produced every time the vacuum actuation of the clutch pedal mechanism is effected.

In Figure 16, a modified form of the invention is shown wherein automatic means are employed for holding the clutch members out of positive position only while the engine is operating at or above idling speed and fluid actuated means for causing action of the clutch are used. In this form of invention, clutch housing 3 contains an automatic clutch of the type previously described, and clutch pedal 251 is rotatably mounted on clutch throwout shaft 74 and urged in retracted position by means of a spring 254. Also mounted on the clutch throwout shaft is a lever having oppositely disposed arms 252 and 253 secured to the shaft by means of a key or the like. Arm 253 is provided with a laterally extended flange 255, against which the clutch pedal proper is adapted to seat when manually depressed from the full line position shown in this figure, thereby causing movement of the clutch shaft and consequent disengagement of the clutch members. This structure is provided so that the clutch shaft may be rotated without causing rotation of the clutch pedal.

Fluid actuated means are provided for causing arm 253 to automatically assume the full line position shown in the drawings, and comprises an arm 257 formed on the arm 253 which carries a pin 258. Pin 258 is slidably associated with a slotted link 259 threaded into a turnbuckle 261. Threaded into the other end of the turnbuckle is a short link 262 pivoted on a stud member 263 secured to an apertured bar 264. Suitable nuts are provided for locking the turnbuckle in adjusted position. Secured to bar 264 are a pair of rods 265 which in turn are secured to similar bar 266, which carries at its mid-point a piston rod 267. The connection between the various members just described is preferably effected by means of nuts 268 turned on reduced portions of the rod members.

A cylinder 269, provided with heads 271 and 272, is rigidly secured to any stationary support by means of a bracket 273 or the like. A pair of apertured plates 274 are associated with the piston rod 267, and clamped between plates 274, by means of nuts, is a piston sealing member 275. The head 271 adjacent the aperture thereof is provided with an annular ring 277 which constitutes a stop for the piston.

Head 272 threadedly receives a coupling member 278 to which is secured a pipe 279 connected to the oil pressure line that supplies the engine with lubricant. In automotive vehicles the pressure gauge for indicating the oil pressure is usually located on the dash, and a T-connection may be inserted in this line and connected to the pipe 279. In lubricating systems of the fluid pressure type, the pressure existing in the system at idling speeds is usually from 25 to 35 pounds, and above idling speeds and throughout the entire range of operation the pressure is caused to take a constant value of say 50 pounds per square inch which is usually produced by inserting a spring pressed by-pass valve in the pressure line. Therefore, a relatively small pressure actuating unit is required for causing the necessary clutch shift movement, and due to the substantially constant pressure that exists in the oil line, no provisions are needed for taking care of excessive pressures in the pressure actuating unit. In this connection, it will be understood that although the pressure actuating units in the present illustration consist of a piston and cylinder, a diaphragm or like unit could be used with equal effectiveness. Moreover, the present piston and cylinder is shown associated with a yoke member merely for the purpose of obviating the necessity for a stuffing box between the piston rod 267, and the cylinder head 271, which would be required were the cylinder reversed and the source of fluid pressure tapped into the head 271, and it is to be understood that the piston could be disposed at the other side of the clutch pedal, that is, on a clutch housing, and no stuffing box or yoke structure would be needed. Moreover, a suitable linkage could be used for reversing the direction of force produced by the fluid actuated unit and thus avoid the yoke.

The mechanism just described causes automatic movement of arm 253 to automatic clutch engaging position as soon as the engine is started due to the oil pressure building up and forcing the piston to its limit of movement against stop 277, at which time the desired clearance exists between the clutch plates when the engine is idling. It is obvious from the operation of the self-operating clutch above described that this is a desirable operation since the clutch mechanism should be disposed in automatic position whenever the engine is rotating at idling speeds or above. The only time that the clutch mechanism need be disposed in the positive position is when the engine is stationary, and it is desired to turn the engine over by coasting or towing the car and a direct drive to the vehicle wheels is essential. Moreover, when the engine is stopped, it is desirable to bring the clutch plates into engagement to avoid warping tendencies of the spring pressures on the positive plate. This desirable result is accomplished in the present form of our invention, since, when the engine is stopped, the oil pressure will drop in the system, and the piston and its associated mechanism will be slowly forced into positive position by virtue of the clutch springs. When this movement is complete, the clutch plates will be in tight engagement, which is highly desirable since the spring pressures tend to straighten the clutch plates.

It will therefore be seen that no manual controls whatever are used for this form of lockout mechanism, and that this mechanism performs the same function automatically that the structure shown in Figure 9 performs under manual control.

In this form of invention we have also disclosed pneumatic means for operating the clutch mechanism and simple control means therefor. Arm 252 is provided with a pin 281 which slides in slot 282 provided in rod 283. Rod 283 constitutes a piston rod which is associated with a piston and cylinder assembly which is identical with that shown in connection with the structure just described, except for the fact it has a larger bore and stroke, and description thereof will not be repeated. This cylinder is placed in fluid communication with a control block 285 by means of a suitable pipe 286 or the like. Control block 285 is provided with a passage 287 which communicates with tube 286 at one end and a similar tube 288 at the other end leading to a suitable source of fluid pressure supply. Larger commercial automotive vehicles are usually provided with air brakes, wherein air in the storage tank is maintained at a pressure in the neighborhood of 50 pounds per square inch, and the tube 288 is adapted to be connected to this source of air pressure, or to an oil pressure reservoir. Block 285 is provided with a passage 289 disposed transversely to the passage 287 and intersecting it. Slidably mounted in passage 289 is a control valve 291 which is provided with a flange 292, an operating knob 293, a reduced valve portion 294, and a bleeder notch 295. Flange 292 works in an enlarged recess 296, and is limited in its upward movement by a plug 297 which is suitably tapped into the block. The control assembly is urged upwardly by a spring 298 disposed in the bottom of the passage 289.

Also provided in the control block is a diagonal passage 299 which intersects passageway 289, and a passage 301 which intersects passages 299 and 287. Passage 299 communicates with the atmosphere and disposed in passage 301 is a valve 302 which is provided with a reduced portion 303 and a notch 304, and connected to link 305. Link 305 is pivoted to arm 306 of the accelerator pedal 307 and the parts are so designed that when the accelerator is in retracted position the valve 302 will shut off any flow of air in the passage 301, and as soon as the accelerator is depressed, this valve vents any air that may be contained in the clutch actuating cylinder at the time, to atmosphere through the notch 304. The control block may be provided with suitable lugs 308 or the like for securing it to the clutch housing or any other suitable support.

With the parts in the position shown, the button 293 has been depressed and air from the tube 288 is passing through the passage 287 and tube 286 into the clutch actuating cylinder, thus causing disengagement of the clutch plates, the accelerator pedal being retracted at the time. The transmission may then be shifted, and button 293 released, which will cut off the air supply and at the same time allow the air to vent from the cylinder through the notch 295 and the passage 299 to the atmosphere and the clutch plates will be returned to automatic position. This operation is repeated for each shift of the transmission. In the event that the operator is careless or attempts to abuse the mechanism by depressing the accelerator while button 293 is depressed and then release the button 293 with consequent release of the clutch while the engine is racing, the device we have provided prevents such abuse, because as soon as the accelerator is depressed the valve 302 will immediately be actuated and the air in the clutch cylinder will be vented to atmosphere through the passage 299 before the engine can attain sufficient speed to cause the centrifugal mechanism to operate. The venting of the air from the clutch cylinder to the atmosphere whether it be through the passage 301 or through the valve 291 is but slightly restricted, and hence the return movement of the clutch and shaft is relatively rapid. The slight cushioning effect that is present is only enough to prevent damage to the mechanism by shock and has nothing to do with the rate of clutch engagement as has been pointed out in connection with the form of the invention disclosed in Figure 15 of the drawings.

The clearance between the clutch plates is adjusted while the engine is operating at idling speeds in the manner previously explained by rotating the turnbuckle 261 in the proper direction to lengthen or shorten the link connecting arm 253 and piston rod 267.

In Figure 18 we have disclosed a modified form of adjusting means for this purpose. Cylinder head 271 is provided with a relatively large aperture and threadedly receives a sleeve 312, having a knurled flange 313 formed thereon. A locknut 315 is turned on sleeve 312, and is adapted to lock it in its adjusted positions. By rotating sleeve 312 it is obvious that the inner end thereof may be caused to contact the piston in various points of its stroke, and accordingly stop in various positions to thereby adjustably control the angular displacement of arm 253 when swung into automatic position.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A prime mover and drive assembly provided with an automatic clutch of the type having a positive clutch plate mounted for movement from a position wherein clutch engagement is automatic, to a position wherein clutch engagement is positive; and means interconnected with said prime mover and said positive plate for causing said positive plate to assume positive clutch engagement position when said prime mover is stationary, and for causing said positive plate to assume automatic position when said prime mover reaches a predetermined speed.

2. A prime mover, a drive assembly provided with an automatic clutch of the type wherein a positive clutch plate is mounted for movement from a position wherein clutch engagement is automatic, to a position wherein clutch engagement is positive; and means interconnecting said prime mover and said positive plate for causing said positive plate to assume positive clutch engagement position when said prime mover is stationary, and for moving said positive plate into automatic position when said prime mover reaches a predetermined speed.

3. The device set forth in claim 2 wherein said prime mover is provided with a fluid pressure lubricating system, and said means comprises a fluid actuated device in fluid communication with said pressure lubricating system, whereby, as fluid pressure builds up in said system, said means will be actuated to move said positive plate into automatic position.

4. In an automatic power transmitting mechanism of the type wherein a prime mover is operably connected to a clutch having mechanism responsive to the speed of the prime mover for coupling and uncoupling the prime mover and the load, a fluid actuated mechanism, and means associated with said fluid actuated mechanism and said prime mover, and automatically operable incident to the discontinuance of the operation of the prime mover, for causing said clutch mechanism to couple said prime mover and said load independently of said speed responsive mechanism.

5. A clutch for use with an internal combustion engine, comprising in combination, driving and driven members normally disengaged substantially at engine idling speed, centrifugal means for automatically engaging the clutch members as the speed of rotation increases and to automatically disengage the members as the speed of rotation resumes substantially idling speed, and means automatically operable incident to the discontinuance of the operation of the engine for effecting clutch engagement, whereby the clutch is engaged while the engine is at rest.

6. A clutch for use with an internal combustion engine, comprising in combination, driving and driven members normally disengaged substantially at engine idling speed, centrifugal means for automatically engaging the clutch members as the speed of rotation increases and to automatically disengage the members as the speed of rotation resumes substantially idling speed, movable clutch controlling means normally in a given position at normal idling condition of the engine and in another position in at rest condition of the engine, and automatic means operatively associating said movable controlling means with the clutch so that the clutch is automatically engaged independently of centrifugal action while the engine is at rest.

7. In a clutch, the combination of rotary driving and driven members, clutch throw-out levers, centrifugal means for engaging and releasing the clutch, in which action the levers actuate, a movable clutch throw-out member normally limiting the movement of the levers in one direction, spring means tending to pack the clutch members together, the action of which is normally impeded by the said throw-out member, and means operable upon discontinuance of rotation of the driving member for rendering the clutch throw-out member ineffective for limiting the movement of the levers, whereby the clutch becomes automatically engaged substantially when the parts come to rest.

8. A clutch for use with an internal combustion engine, comprising in combination, driving and driven members normally disengaged substantially at engine idling speed, centrifugal means for automatically engaging the clutch members as the speed of rotation increases and for automatically disengaging the members as the speed of rotation resumes substantially idling speed, a clutch controlling member, and means acting upon the clutch controlling member, said means being automatically operable incident to the discontinuance of operation of the driving member to automatically condition the controlling member for engagement of the clutch independently of centrifugal action, whereby the clutch is engaged while the driving member is at rest, and to condition the controlling member to operating condition substantially upon the resumption of operation movement of the driving member from an at rest condition.

9. In a power transmitting mechanism adapted for use with an internal combustion engine, a member adapted to be driven by said engine; means for automatically establishing a driving connection between said engine and said driven member when the engine is operated at speeds substantially in excess of a predetermined idling speed, and for disconnecting said engine and member when said engine resumes idling speed; and means for automatically establishing a driving connection between said engine and driven member when the engine is stopped.

10. A clutch adapted for use with an internal combustion engine comprising, driving and driven members normally disengaged substantially at engine idling speed; centrifugally operable means for engaging the clutch members as the speed of rotation increases, and for allowing the members to disengage as the speed of rotation resumes substantially idling speed; and mechanism for automatically effecting clutch engagement when the engine is stopped.

11. In a clutch driving and driven members mounted for engagement and disengagement; engaging means tending to bring said members into engagement; means for automatically maintaining said members disengaged against the action of said engaging means when said driving member is rotating at a predetermined idling speed, and for automatically allowing said engaging means to bring said members into engagement when said driving member is at rest or is rotated at speeds substantially lower than said idling speed; and centrifugally operable means for automatically bringing said members into engagement when said driving member is rotated at speeds substantially in excess of said idling speed.

12. In a clutch adapted for use with an internal combustion engine, driving and driven members mounted for engagement and disengagement; mechanism for controlling engagement and disengagement of said members; an axially movable clutch throwout member operable to actuate said mechanism; means for causing said throwout member to limit the engaging operation of said mechanism when said engine is operating at a predetermined idling speed, and for automatically allowing said mechanism to undergo engaging operation when said engine comes substantially to rest; and centrifugally operable means for automatically bringing said members into engagement when the driving member is rotated at speeds substantially in excess of said idling speed.

13. In a clutch, adapted for use with an internal combustion engine, driving and driven members mounted for engagement and disengagement; clutch throwout levers for controlling engagement and disengagement of said members; a movable clutch throwout member operable to actuate said levers; means for automatically causing said throwout member to limit the engaging movement of said levers when said engine is operating at a predetermined idling speed, and for automatically allowing said levers to move toward engaging position when said engine comes substantially to rest; and centrifugally operable means for automatically bringing said members into engagement when the driving member is rotated at speeds substantially in excess of said idling speed.

14. A clutch for use with an internal combustion engine, comprising in combination, driving and driven members normally disengaged substantially at engine idling speed; means for automatically engaging the clutch members as the speed of rotation increases and for automatically disengaging the members as the speed of rotation resumes substantially idling speed; means automatically operable incident to discontinuance of operation of the engine for effecting clutch engagement; and means for increasing or decreasing the clearance that normally exists between said members at engine idling speed.

15. A clutch for use with an internal combustion engine, comprising in combination, driving and driven members normally disengaged substantially at engine idling speed; centrifugal means for automatically engaging the clutch members as the speed of rotation increases and for automatically disengaging the members as the speed of rotation resumes substantially idling speed; movable clutch controlling means normally in a given position at normal idling condition of the engine and in another position in at rest condition of the engine; means operatively associating said movable controlling means with the clutch so that the clutch is automatically engaged independently of centrifugal action when the engine is at rest; and means, operably associated with said last-named means, for effecting adjustive movements of said clutch members toward and away from engaged condition independently of operating movements of said clutch controlling means.

16. A clutch for use with an internal combustion engine, comprising driving and driven members normally disengaged substantially at engine idling speed; means for automatically engaging said members as the speed of rotation increases and for automatically disengaging said members as the speed of rotation resumes substantially idling speed; means automatically operable incident to discontinuance of the operation of the engine for effecting clutch engagement, whereby the clutch is normally engaged while the engine is at rest; and means for effecting clutch disengagement when the engine is at rest.

17. A clutch for use with an internal combustion engine, comprising driving and driven members normally disengaged substantially at engine idling speed; means for automatically engaging said members as the speed of rotation increases and for automatically disengaging said members as the speed of rotation resumes substantially idling speed; means automatically operable incident to discontinuance of the operation of the engine for effecting clutch engagement, whereby the clutch is normally engaged while the engine is at rest; and means for disengaging said members when they have become engaged in response to acceleration of the engine.

18. A clutch adapted for use with an internal combustion engine comprising, driving and driven members mounted for engagement and disengagement; a plurality of throwout levers operable to move said members toward disengaged condition; a movable throwout mechanism adapted to cooperate with said levers and effect clutch disengaging operation thereof when it is moved in one direction; means for automatically moving said throwout mechanism a predetermined distance in said direction to effect clutch disengagement when said engine is operated at a predetermined idling speed, and for automatically effecting clutch engagement when said engine is stopped; means for automatically effecting clutch engagement when said engine is operated at speeds substantially in excess of idling speed; and means adapted to operate upon said throwout mechanism and effect clutch disengagement when said members have become automatically engaged.

19. A clutch adapted for use with an internal combustion engine comprising, driving and driven members mounted for engagement and disengagement; a plurality of throwout levers operable to move said members toward disengaged condition; a movable throwout mechanism adapted to cooperate with said levers and effect clutch disengaging operation thereof when it is moved in one direction; means for automatically moving said throwout mechanism a predetermined distance in said direction to effect clutch disengagement when said engine is operated at a predetermined idling speed, and for effecting clutch engagement when said engine is stopped; means for automatically effecting clutch engagement when said engine is operated at speeds substantially in excess of idling speed; and means for moving said throwout mechanism a further distance in said direction for effecting clutch disengagement when said members have become automatically engaged.

20. In a clutch including a throw-out collar operable to disengage the clutch and centrifugal means for automatically throwing in the clutch at a predetermined R. P. M. and throwing out the clutch at less than said predetermined R. P. M., the combination of clutch spring means operating, when effective, to engage the clutch vacuum operated means, which, when operative, relieves the clutch of the pressure of the clutch spring means, and a valve operable at the will of the operator for controlling the operation of the vacuum operated means.

21. In a clutch including a throw-out collar operable to disengage the clutch and centrifugal means for automatically throwing in the clutch at a predetermined R. P. M. and throwing out the clutch at less than said predetermined R. P. M., the combination of clutch spring means operating, when effective, to engage the clutch, vacuum operated means, which, when operative, relieves the clutch of the pressure of the clutch spring means, and a valve operable at the will of the operator for controlling the operation of the vacuum operated means, and a clutch pedal for operating the throw-out collar to throw out the clutch against the action of the spring means when the latter is effective.

22. In a power transmitting mechanism, a driving member having a plurality of chordal slots formed therein, a driving plate associated with said driving member and having means mounting the same for rotation with said driving member and for movement axially thereof, spring means urging said driving plate toward said driving member; weight levers extending through said slots and having heads disposed between said driving member and said driving plate and seating in elongated bearing recesses formed in said driving plate for causing said plate to move away from said member when said member reaches a predetermined speed, and means associated with said head and recesses for causing said heads to pivot in said recesses when said levers swing outward in response to rotation of said driving member.

23. In a power transmitting mechanism, a driving member having a plurality of chordal slots formed therein, a driving plate associated with said driving member and having means mounting the same for rotation with said driving member and for movement axially thereof; spring means urging said driving plate toward said driving member; weight levers extending through said slots and having heads disposed between said driving member and said driving plate and seating in elongated bearing recesses formed in said driving plate for causing said plate to move away from said member when said member reaches a predetermined speed, the walls of said recesses meeting at an angle to provide an angular seat and said head having knife edges for pivotal cooperation with said seats.

24. In a power transmitting mechanism, a driving member having a plurality of chordal slots formed therein; a driving plate associated with said driving member and having means mounting the same for rotation with said driving member and for movement axially thereof, spring means urging said driving plate toward said driving member; a plurality of outwardly rockable weight levers extending through said slots and having heads disposed between said driving member and said driving plate and seating in elongated bearing recesses formed in said driving plates for causing said plate to move away from said member when said member attains a predetermined speed, said heads each having a fulcrum edge, and means for causing each of said heads to pivot about a definite axis on the bottom of said recesses when said levers rock outwardly.

WADE D. MORTON.
WILLIAM E. HAUPT.